United States Patent
Wong

(10) Patent No.: US 10,307,894 B1
(45) Date of Patent: Jun. 4, 2019

(54) DIE CAST MAGNETIC PAD

(71) Applicant: Harry Wong, South Pasadena, CA (US)

(72) Inventor: Harry Wong, South Pasadena, CA (US)

(*) Notice: Subject to any disclaimer, the term of this patent is extended or adjusted under 35 U.S.C. 154(b) by 0 days.

(21) Appl. No.: 15/935,786

(22) Filed: Mar. 26, 2018

(51) Int. Cl.
*B25B 5/16* (2006.01)
*B25B 5/14* (2006.01)
*F16B 1/00* (2006.01)
*B25B 5/10* (2006.01)

(52) U.S. Cl.
CPC .............. *B25B 5/163* (2013.01); *B25B 5/147* (2013.01); *F16B 1/00* (2013.01); *B25B 5/102* (2013.01); *F16B 2001/0035* (2013.01)

(58) Field of Classification Search
CPC ............ B25B 5/163; B25B 5/147; F16B 1/00
See application file for complete search history.

(56) References Cited

U.S. PATENT DOCUMENTS

| | | | |
|---|---|---|---|
| 5,895,018 A | 4/1999 | Rielo | |
| 6,305,656 B1 * | 10/2001 | Wemyss | A47G 23/0216 206/5 |
| 6,888,940 B1 * | 5/2005 | Deppen | B60R 11/0241 379/446 |
| 6,904,710 B2 * | 6/2005 | Lawrence | G02C 11/00 24/3.3 |
| 7,431,251 B2 | 10/2008 | Carnevali | |
| 7,564,331 B2 * | 7/2009 | Hashimoto | A44C 5/2042 24/303 |
| 9,157,573 B1 | 10/2015 | Zach | |

* cited by examiner

*Primary Examiner* — Robert Sandy
*Assistant Examiner* — David M Upchurch
(74) *Attorney, Agent, or Firm* — Jen-Feng Lee, Esq.

(57) ABSTRACT

Present invention teaches a magnetic pad to work with clamping tools where the magnet and protrusions on the top surface provide for easy aligning and connection from the clamping tool to the pad, relying primarily on the use of a ring-shaped magnet embedded in the top surface. The bottom surface provides flexible holding surface upon work pieces with two grooves of different sizes. The pad materials can be made from soft metals to eliminate marring the surface of work pieces.

5 Claims, 3 Drawing Sheets

DIE CAST MAGNETIC PAD

FIELD AND BACKGROUND OF THE INVENTION

Present invention disclosed and claimed a pad suitable for working with clamping tools where the aligning the clamping tool to the work object will be made easier and more efficient. The use of a magnet embedded in the pad, giving it the natural "clicking to attach" attribute of the magnet, as well as the structure of the protrusions on the pad, helps to quickly align the clamping tool to metal work objects such as pipes.

Mounting screws are not needed when using the present invention, since the attachment of the clamping tool to the work object and the removal is done in a snap, due to the use of the magnet and the shape and location of the protrusions.

SUMMARY OF THE INVENTION

The invention relates to a pad for clamping tools where the aligning the clamping tool to the work object will be made easier by the use of magnet due to the naturally "clicking" power of the magnet and the structure of the protrusions to quickly align the tool to metal work objects such as pipes.

A round disc has a top surface and a bottom surface. A ring-shaped permanent magnet is embedded in the central portion of said top surface and is flush with a lower level plane within the top surface.

A plurality of protrusions is formed evenly spaced and next to the edge of the top surface, each protrusion containing an upper level tier and a lower level tier. Each protrusion's upper level tier is flush with the edge of the top surface; each protrusion's lower level tier is flush with the lower level plane within the top surface and the embedded permanent magnet.

A large v-groove and a small v-groove are set at a 90-degree relationship, with the two grooves intersecting each other at the center point of the bottom surface of said round disc.

The effect of ease of use due to magnetic connect and disconnect is vastly different from some known arts.

For example, the U.S. Pat. No. 9,157,573 (573 Patent) by Zach teaches a magnetic holding device. Products made pursuant to the disclosure of 573 Patent will not work without the use of pressure sensitive adhesive. This element is completely missing from present application.

The U.S. Pat. No. 7,431,251 (251 Patent) by Carnevali teaches a magnetic mounting platform. Products made pursuant to the disclosure of the 251 Patent cannot work with a clamping tool in a way to provide easy and convenient alignment, for the obvious lack of the guiding "protrusions".

The U.S. Pat. No. 5,895,018 (018 Patent) by Rielo teaches a magnetic support attachment. The 018 Patent has an express limitation that causes it to be inapplicable to present application: it has express limitation that the magnetic structure is for supporting thin pliable material (such as fabric), making the disclosure completely unsuitable for use with the problems/purposes intended by the present application.

DESCRIPTION OF THE DRAWINGS

The accompanying drawings, which are incorporated in and constitute a part of this specification, illustrate and exemplify the preferred embodiments of the invention. Together with the description, serve to explain the principles of the invention.

A brief description of the drawings is as follows.

DETAILED DESCRIPTION OF THE PREFERRED EMBODIMENT

The Die cast magnetic pad 100 of present invention consists of a round disc 10 having a top surface and a bottom surface.

Figure 1:
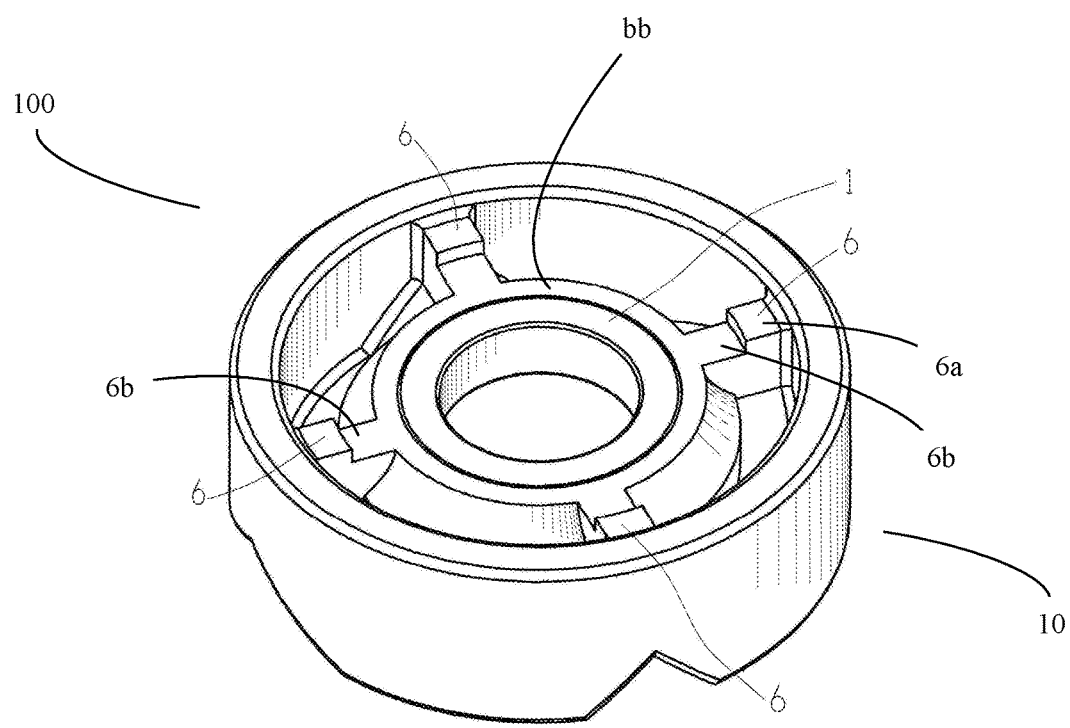
FIG. 1 is the perspective view of the top surface of the present invention.

As shown in FIG. 1, a ring-shaped permanent magnet 1 is embedded in the central portion of said top surface and is flush with a lower level plane bb within the top surface.

A plurality of protrusions 6 is formed evenly spaced and next to the edge of the top surface. Each of said protrusions 6 is shaped like a step of a simple staircase: each contains an upper level tier 6a and a lower level tier 6b. Each protrusion's upper level tier 6a is flush with the edge of the top surface; each protrusion's lower level tier 6b is flush with the lower level plane bb within the top surface and the embedded permanent magnet 1.

Figure 2:
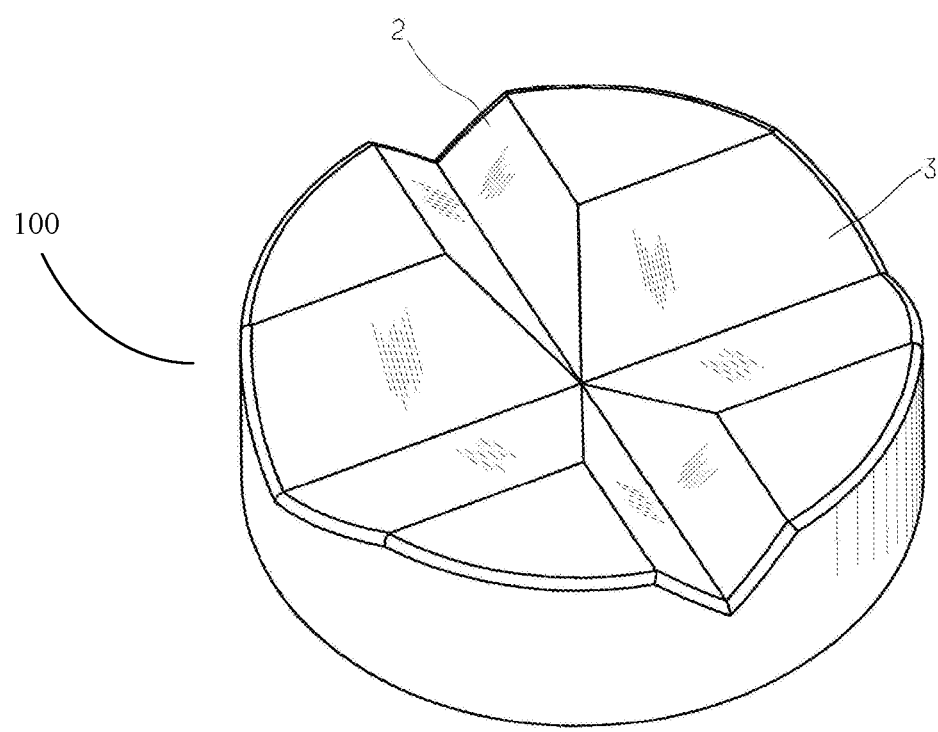
FIG. 2 is the perspective view of the bottom surface of the present invention.

As shown in FIG. 2, a small v-groove 2 and a large v-groove 3 are set at a 90-degree relationship, with the two grooves intersecting each other at the center point of the bottom surface of said round disc 10. The two grooves of different sizes provide needed flexibility to work on objects of different sizes, such as tubes of varying diameters.

The material for the round disc 10 can be made from soft die cast material such as aluminum. Since the material is relatively soft, the surface of a work object is not likely to be marred.

In one preferred embodiment, four protrusions 6 are formed and are placed at 90 degrees apart around the edge of the top surface.

In another preferred embodiment, three protrusions 6 are formed and are placed at 120 degrees apart around the edge of the top surface.

In yet another preferred embodiment, two protrusions 6 are formed and are placed at 180 degrees apart around the edge of the top surface.

The lower level plane bb can be made to be ring-shaped and concentrically enclosing the ring-shaped permanent magnet 1.

The permanent magnet 1 in the top surface provides an easy and convenient way to attach to a clamp pad 4 of a clamping tool 5, provided that the clamp pad 4 has positive susceptibility to magnetic power. Just "click" the clamp pad 4 to the ring-shaped permanent magnet 1 of the present invention, then regular operation can proceed, saving the step of using a tightening screw to keep the clamping tool attached properly to a pad without the structure of present invention.

Figure 3:
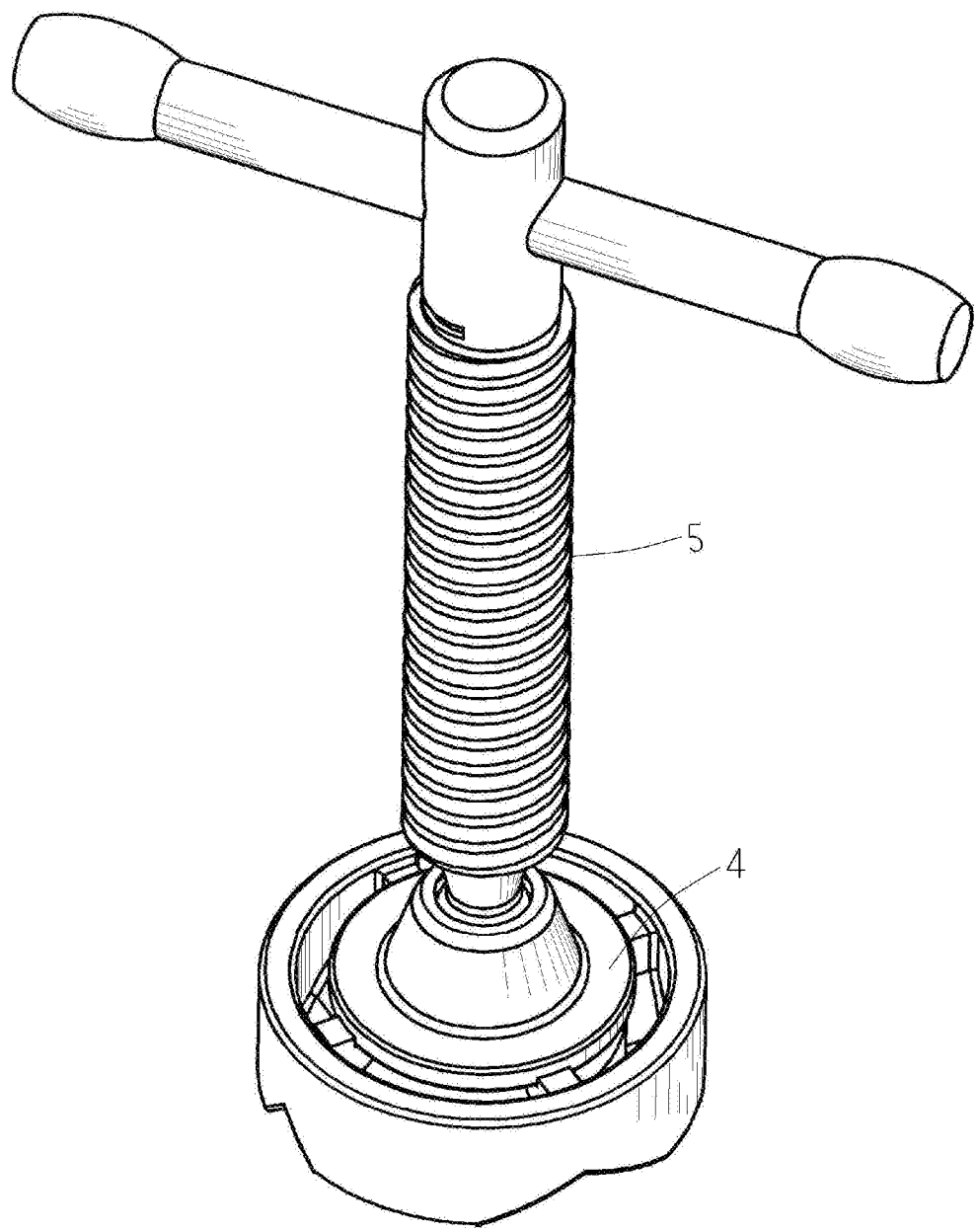
FIG. 3 is the perspective view of the present invention when a steel clamp pad clipped in; such clipped in is done efficiently due to the guiding function of the protrusions and the magnetic attraction.

As shown in FIG. 3, there is no tightening screw; removing the clamp tool (containing the pad 4) is just as easy by simply pulling away the clamp tool from the magnetic pad 100 of present invention.

The permanent magnet 1 and the protrusions 6 help to quickly align the clamp pad 4 to the magnetic pad 100 of present invention, so that the turning, or other operation, of the clamp tool is aligned to the center of the clamp pad 4 quickly and easily.

It should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A die cast magnetic pad, comprising:
 a round disc having a top surface and a bottom surface;
 a ring-shaped permanent magnet embedded in a central portion of said top surface and is flush with a lower level plane within the top surface;
 a plurality of protrusions formed evenly spaced and next to an edge of the top surface, each of said protrusions contains an upper level tier flush with the edge of the top surface and a lower level tier flush with the lower level plane within the top surface and the embedded permanent magnet; and
 a first v-groove and a second v-groove set at a 90-degree relationship, with two grooves intersecting each other at a center point of the bottom surface of said round disc, wherein the first v-groove is wider than the second v-groove.

2. The pad of claim 1, wherein 4 protrusions of the plurality of protrusions are placed at 90 degrees apart around the edge of the top surface.

3. The pad of claim 1, wherein 2 protrusions of the plurality of protrusions is 2 are placed at 180 degrees apart around the edge of the top surface.

4. The pad of claim 1, wherein a material for the round disc is made of die cast material.

5. The pad of claim 1, wherein the lower level plane is ring-shaped and concentrically enclosing the ring-shaped permanent magnet.

* * * * *